United States Patent [19]

Flowers

[11] Patent Number: 4,694,235
[45] Date of Patent: Sep. 15, 1987

[54] CAPACITIVE POSITION SENSOR

[75] Inventor: Peter T. Flowers, Dorchester, Mass.

[73] Assignee: General Scanning, Inc., Watertown, Mass.

[21] Appl. No.: 893,095

[22] Filed: Aug. 1, 1986

[51] Int. Cl.$^4$ .............................................. G05B 1/06
[52] U.S. Cl. ...................................... 318/662; 361/289
[58] Field of Search ....................... 361/289, 290, 292; 318/662; 324/61 R, 60 C; 310/219

[56] References Cited

U.S. PATENT DOCUMENTS

| Re. 31,062 | 10/1982 | Burke, Jr. | 335/29 |
| 2,426,199 | 8/1947 | Gould | 310/219 |
| 3,213,340 | 10/1965 | Robertson | 361/289 |
| 3,337,789 | 8/1967 | Ono et al. | 321/24 |
| 3,447,047 | 5/1969 | Lindsay | 361/289 |
| 3,517,282 | 6/1970 | Miller | 361/289 |
| 3,609,485 | 9/1971 | Dostal | 318/132 |
| 3,624,574 | 11/1971 | Montague | 335/230 |
| 3,643,140 | 2/1972 | Allison | 318/138 |
| 3,652,955 | 3/1972 | Cruger et al. | 331/116 |
| 3,922,590 | 11/1975 | Warren et al. | 318/138 |
| 4,035,697 | 7/1977 | Arnold, Jr. | 361/289 |
| 4,110,879 | 9/1978 | Burke, Jr. | 29/25.42 |
| 4,135,119 | 1/1979 | Brosens | 318/128 |
| 4,142,144 | 2/1979 | Rohr | 324/61 R |
| 4,187,452 | 2/1980 | Knappe et al. | 318/128 |
| 4,189,699 | 2/1980 | Burke, Jr. | 335/29 |
| 4,240,141 | 12/1980 | Vasiliev et al. | 318/114 |
| 4,392,092 | 7/1983 | Gassner | 318/127 |

Primary Examiner—Benjamin Dobeck

[57] ABSTRACT

A capacitive position sensor for sensing changes in the position of a rotating element, in which there are two sets of stationary capacitive surfaces, one set forming a first integral unit, the other set forming a second integral unit; the two units are held together with the surfaces of each set resting in corresponding spaces in the other unit such that all surfaces of both sets intersect a common radial plane and the surfaces of one set are electrically isolated from the surfaces of the other set.

10 Claims, 6 Drawing Figures

4,694,235

CAPACITIVE POSITION SENSOR

BACKGROUND OF THE INVENTION

This invention relates to a capacitive sensor for determining the position of a moving element, for example, the rotor of an electromechanical actuator.

In typical capacitive sensors, for example, the one shown in Brosens, U.S. Pat. No. 4,135,119, four identical stationary curved plate electrodes are arranged around the lower end of the rotor with their inner surfaces facing the rotor. Each plate is electrically connected to the plate on the opposite side of the rotor. Thus there are two pairs of plates. The rotor has a pair of pole faces. Each pole face cooperates with two of the plates, one from each pair, such that the difference in the capacitances between the pole face and each of the two plates is a function of the rotor's angular position. In typical applications the four plates are soldered at their bases to a printed circuit board and are supported by an epoxy potting material.

It has also been proposed to form the electrode plates on two identical rings that are stacked axially (but with one rotated relative to the other). The rotor pole faces then would cooperate with the plate surfaces on the two rings to provide the desired capacitance differential.

SUMMARY OF THE INVENTION

One general feature of the invention is a capacitive position sensor in which the stationary capacitive surfaces make up two sets, one set forming a first integral unit, the other set forming a second integral unit; the two units are held together with the capacitive surfaces of each set resting in corresponding spaces in the other unit such that all surfaces of both sets intersect a common radial plane and the surfaces of one set are electrically isolated from the surfaces of the other set.

Preferred embodiments of the invention include the following features. Each integral unit is a closed ring-shaped single metal piece with the surfaces and spaces defined around its circumference. The two units are identical. Each unit includes a set of electrode plates (each bearing one of the capacitive surfaces) and a planar ring-shaped base that bridges the plates; the plates project axially from the base. An insulative board lies between and electrically insulates the respective planar bases of the two integral units. Each unit has two surfaces arranged on opposite sides of the rotating element, and the rotating element has two capacitive surfaces.

The capacitive position sensor is mechanically rigid because pairs of the plates are integrally formed and the two resulting rings are rigidly registered relative to one another. The rotor is well shielded from surfaces other than the electrode plate surfaces, minimizing stray capacitances to ground. The construction is compact and economical and is accomplished using thermally compatible materials. Null and gain drift resulting from temperature and aging are reduced; temperature stability is within the range of 100 parts per million per degree Centigrade. The assembly can be stress relieved before assembly, and no machining is required after assembly. The sensor is useful, e.g., in optical scanners.

Other advantages and features will become apparent from the following description of the preferred embodiment, and from the claims.

DESCRIPTION OF THE PREFERRED EMBODIMENT

We first briefly describe the drawings.

DRAWINGS

STRUCTURE

Figure 1:
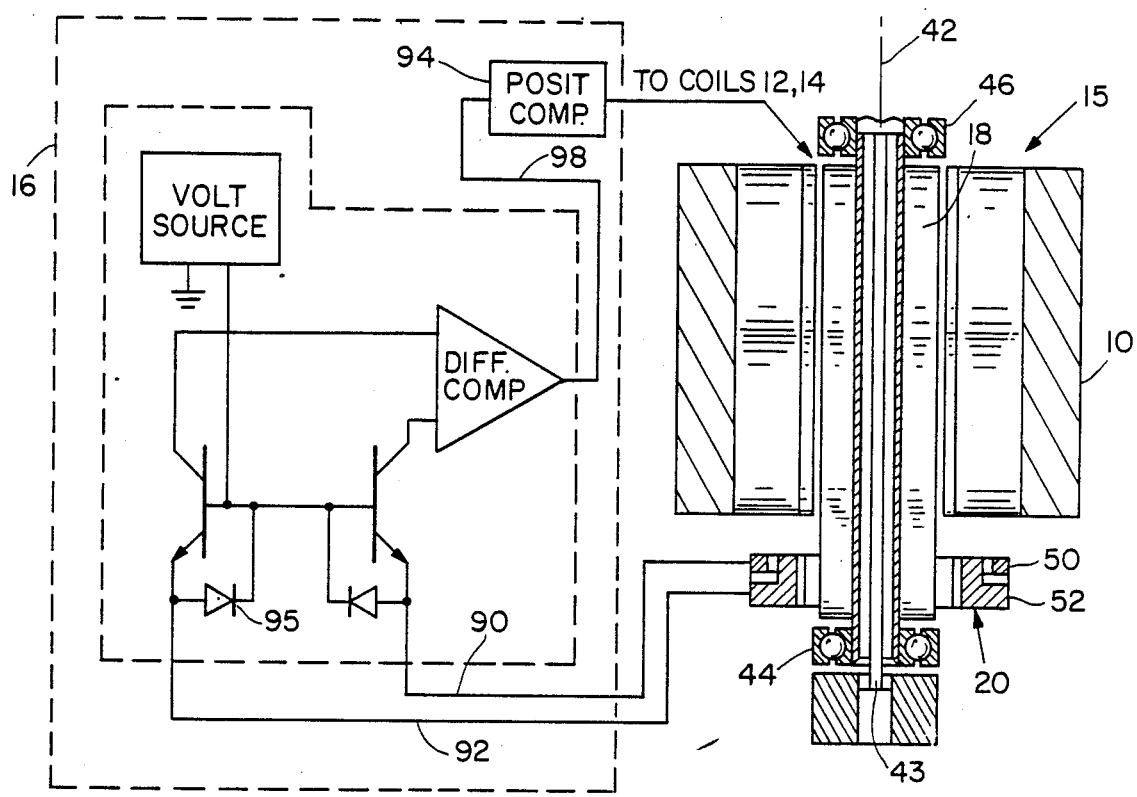
FIG. 1 is a cross-sectional side view of an electromechanical actuator and a schematic diagram of a feedback circuit used to drive the actuator.
Figure 2:
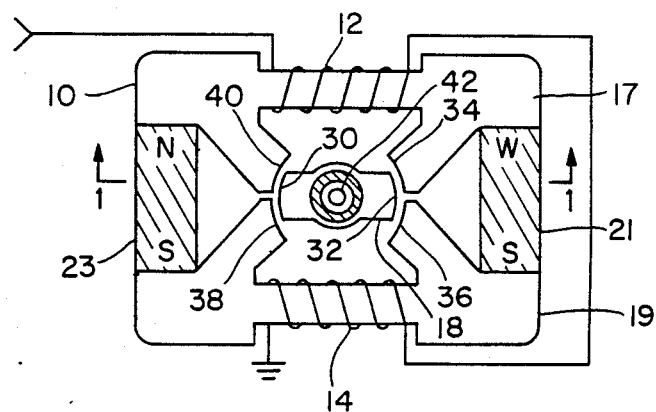
FIG. 2 is a top view of the actuator.

Referring to FIGS. 1, 2, conventional actuator 10 has drive coils 12, 14 powered by a drive circuit 16 to cause rotor 18 of actuator 10 to rotate to a desired position, based on position information derived from capacitive position sensor assembly 20. The stator 15 of actuator 10 includes two stator pole pieces 17, 19 and two permanent magnets 21, 23.

Rotor 18 (50/50 nickel/iron) includes cylindrical pole faces 30, 32 (diameter 0.493 inches). Rotor 18 is mechanically grounded by a torsion bar 43. Pole faces 30, 32 cooperate with stator pole faces 34, 36, 38, 40 (on pole pieces 17, 19) to drive rotor 18 about an axis 42, supported on bearings 44, 46. The lower end of rotor 18 extends axially beyond stator pole faces 34, 36, 38, 40 and pole faces 30, 32 there provide capacitive surfaces 31, 33 that cooperate with capacitive position sensor assembly 20 to provide position information to circuit 16.

Figure 3:
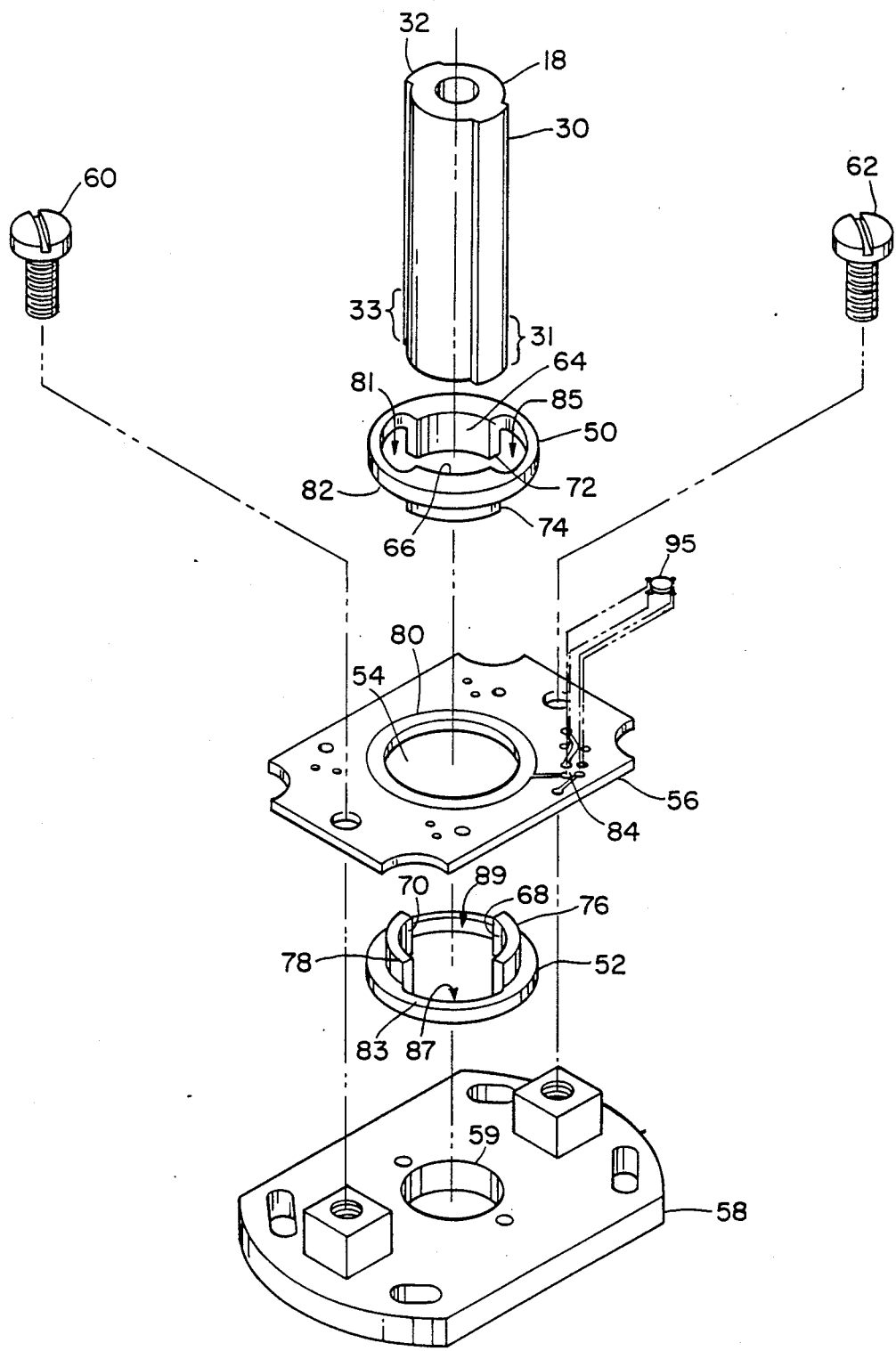
FIG. 3 is an exploded view of the capacitive position sensor portions of the actuator.

Referring to FIG. 3, the capacitive position sensor assembly 20 includes two identical integral metal rings 50, 52 (monel) each 0.250" high. These rings mate with each other through a round hole 54 in a printed circuit board 56 to form a sandwich which is mounted to a monel clamp base 58 by screws 60, 62. Clamp base 58 is fixed relative to stator 15 and provides a rear bearing seat 59 for holding the rear bearing of rotor 18. Inner capacitive surfaces 64, 66, 68, 70 of 0.055 inch thick electrode plates 72, 74, 76, 78 define a 0.500 inch diameter cylinder which surrounds rotor 18 leaving a 0.0035 inch air gap between capacitive surfaces 64, 66, 68, 70 and rotor capacitive surfaces 31, 33. The outer surfaces of electrode plates 72, 74, 76, 78 have a diameter of 0.610 inches which fits within the 0.625 inch diameter of opening 54 in printed circuit board 56.

Thus there are two sets of capacitive sufaces: one set 64, 66 on ring 50, the other set 68, 70 on ring 52. The two surfaces of each set lie on opside sides of the rotor.

Printed circuit board 56 includes a 0.062 inch thick printed circuit board substrate which separates rings 50, 52, keeping them electrically isolated from each other. On the top surface of board 56 is printed a copper rim 80 which is soldered to the under surface of a 0.093 inch thick lip 82 of ring 50 providing electrical contact 84 for connecting ring 20 (and hence the two capacitive surfaces 64, 66) to circuit 16 (FIG. 1). The outer diameter of rim 80 is 0.850 inches which is identical to the outer diameter of lip 82. On the bottom surface of board 56 is printed an identical copper rim (not shown) which connects to a 0.093 inch thick lip 83 of ring 52 in an identical manner.

Each ring 50, 52, includes two cutouts 81, 85, and 87, 89. Each cutout lies between two adjacent plates, and has an inner wall diameter of 0.700 inches, large enough to accommodate an electrode plate of the other ring.

Figure 4:
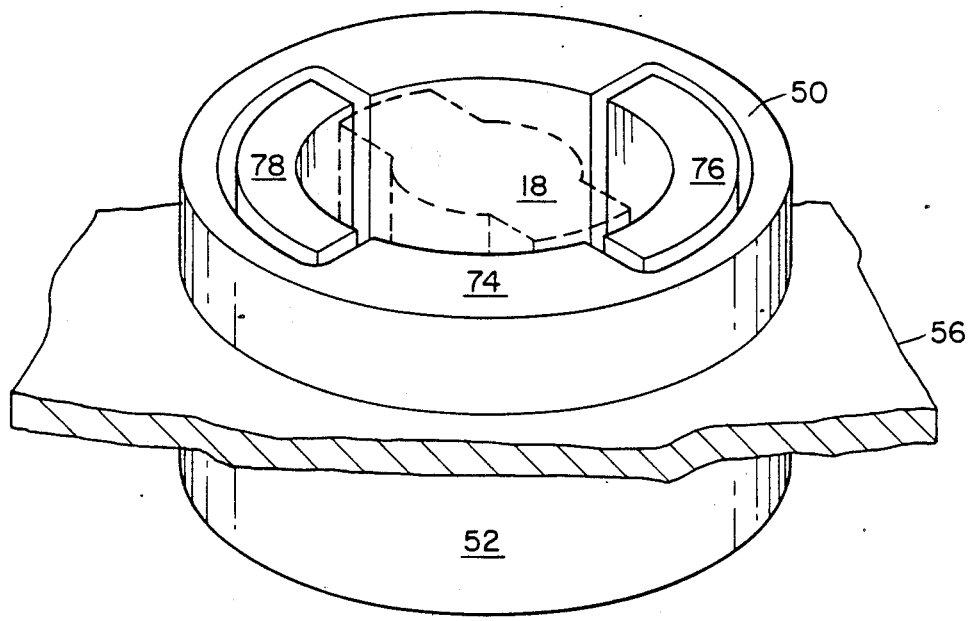
FIG. 4 is a schematic isometric view of the capacitive sensor rings as assembled.
Figure 5A:
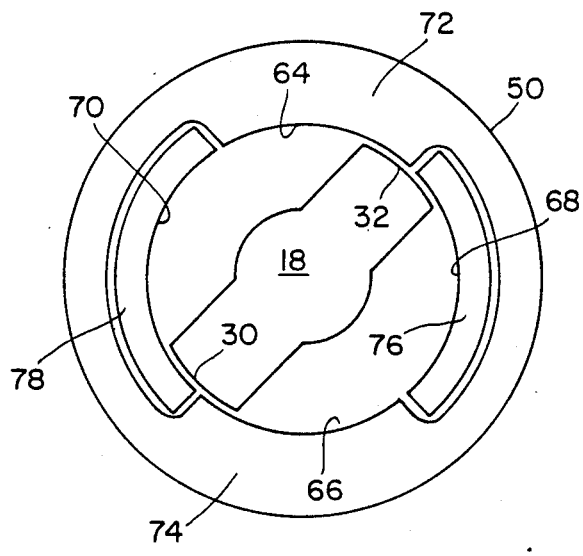
FIGS. 5A, 5B are top views of the capacitive position sensor with two different rotor positions.
Figure 5B:
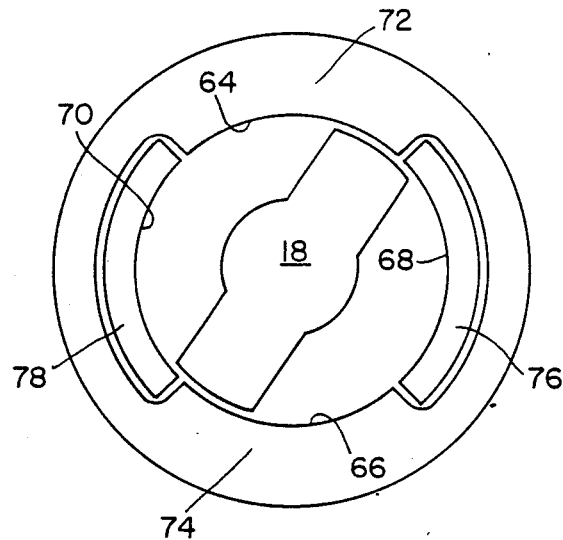

Thus, referring to FIGS. 4, 5A, 5B, when assembled, the plates of each ring lie within the cutouts of the other ring with sufficient space to keep them electrically isolated from each other, and the two rings are spaced apart axially by board 56. In addition, the four capacitive surfaces 64, 66, 68, 70 all intersect a common plane., e.g., the plane of board 56.

Referring again to FIG. 1, circuit 16 connects to rings 50, 52 via lines 90, 92. This circuit, which operates as described in Rohr, U.S. Pat. No. 4,142,144, assigned to the same assignee as this application, and incorporated herein by reference, produces on line 98 a current which is proportional to the difference in the capacitances to ground (note that rotor 18 is electrically grounded) of rings 50, 52. Based on this current, which is indicative of the rotor's position, position comparator 94 determines if the rotor is in the desired position, and, if necessary, adjusts the current in coils 12, 14 to correct the rotor's position.

Referring again to FIG. 3, diodes 95 mounted on board 56 are the diodes shown in the schematic of FIG. 1. Preferably the remainder of circuit 16 (FIG. 1), except for position comparator 94, is mounted on a separate printed circuit board (not shown) that is housed within the casing of actuator 10.

OPERATION

Referring to FIGS. 5A, 5B, as rotor 18 moves counter clockwise from the position in FIG. 5A to the position in FIG. 5B, the areas of pole faces 30, 32 that overlap with ring 50 increase while the areas that overlap with ring 52 decrease. Since the capacitance between a given ring and the rotor is proportional to the area of overlap, the rotor's position can be determined by computing the difference between the capacitances to ground of rings 50, 52.

Other embodiments are within the following claims.

I claim:

1. A capacitive sensor for sensing changes in the position of a rotating element relative to a stationary element, comprising
   a capacitive surface on said rotating element,
   two sets of capacitive surfaces that are fixed relative to said stationary element,
   said rotating surface being arranged to cooperate both with one said fixed surface of one said set, and with one said fixed surface of the other said set such that as the area of overlap of said rotating surface with said one fixed surface increases, the area of overlap with said other fixed surface decreases, and vice versa,
   said surfaces of one said set forming a first integral unit,
   said surfaces of the other said set forming a second integral unit,
   said two units each defining spaces to receive the surfaces of the other said unit,
   said two units being held together with the surfaces of each said set resting in the corresponding spaces in the other said unit such that all of said surfaces of both said sets intersect a common plane, and the surfaces of said one set are electrically isolated from the surfaces of said other set.

2. The capacitive sensor of claim 1 wherein each said unit comprises a closed ring-shaped member with said surfaces and said spaces defined around the circumference of said member.

3. The capacitive sensor of claim 1 wherein each said integral unit comprises a single metal piece.

4. The capacitive sensor of claim 1 wherein said metal piece comprises a closed metal ring.

5. The capacitive sensor of claim 1 wherein said first and second integral units are identical.

6. The capacitive sensor of claim 1 wherein each said integral unit comprises
   a set of electrode plates each bearing one said surface, and
   a planar base that bridges said plates,
   said plates projecting axially from said base.

7. The capacitive sensor of claim 6 wherein said planar base is ring-shaped.

8. The capacitive sensor of claim 6 further comprising an insulative board that lies between and electrically insulates the respective planar bases of said integral units.

9. The capacitive sensor of claim 1 wherein each said set comprises two said surfaces arranged on opposite sides of said rotating element.

10. The capacitive sensor of claim 1 wherein said rotor comprises two said capacitive surfaces.

* * * * *